United States Patent [19]

Renis et al.

[11] 3,900,476
[45] Aug. 19, 1975

[54] 2[2'-PYRIMIDYLAMINO]QUINAZOLINES AND THEIR PREPARATION

[75] Inventors: Harold E. Renis, Portage; Louis L. Skaletzky, Kalamazoo, both of Mich.

[73] Assignee: The Upjohn Company, Kalamazoo, Mich.

[22] Filed: May 17, 1973

[21] Appl. No.: 361,311

[52] U.S. Cl.... 260/256.4 Q; 260/515 R; 260/521 R; 424/251
[51] Int. Cl.² .................................... C07D 239/84
[58] Field of Search.............. 260/256.4 Q, 256.4 N

[56] References Cited
UNITED STATES PATENTS

| | | | |
|---|---|---|---|
| 3,027,370 | 3/1962 | Bindler | 260/256.4 N |
| 3,177,218 | 4/1965 | Brown | 260/256.4 Q |
| 3,184,462 | 5/1965 | Scarborough et al. | 260/256.4 Q |
| 3,322,756 | 5/1967 | Ruschig et al. | 260/256.4 Q |

FOREIGN PATENTS OR APPLICATIONS 1,941,761  2/1971  Germany ............................ 260/251

OTHER PUBLICATIONS

Bell et al., J. Med. Pharm. Chem. p. 63 (1962).

*Primary Examiner*—Donald G. Daus
*Assistant Examiner*—David E. Wheeler
*Attorney, Agent, or Firm*—Martin B. Barancik; Roman Saliwanchik

[57] ABSTRACT

Novel Compounds of formula:

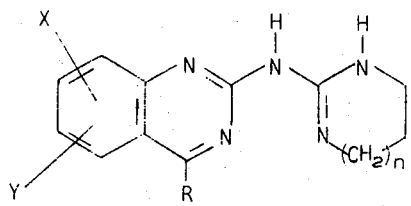

and the acid addition salts thereof are disclosed wherein X and Y are each selected from hydrogen, halogen, lower alkyl and lower alkoxy. R represents lower alkyl while $n$ is an integer of from 0 to 1, inclusive. Disclosed also are methods of preparing and using the novel compounds of the invention which are useful in vitro antiviral agents.

13 Claims, No Drawings

2[2'PYRIMIDYLAMINO]QUINAZOLINES AND THEIR PREPARATION

BACKGROUND OF THE INVENTION

1. Field of the Invention

The invention concerns novel quinazoline compounds; methods of their preparation and use. More particularly, the invention concerns antiviral substituted and unsubstituted 2-(1,3-diaza-2-cycloalken-2-ylamino)quinazolines.

2. Description of the Prior Art

Prior hereto, 2-guanidinoquinazolines and methods of their preparation were described by Theiling et al.,; see J.A.C.S., 74, 1834, (1952). British Pat. No. 1,024,907 discloses the preparation of certain 2-guanidinoquinazolines and their use as fungicides. Rosowsky at al., J. Org. Chem. 30, 285 (1965) and 29, 2881 (1964) describes certain 2-guanidinoquinazolines, as folic acid antimetabolites. Beil et al., J. Med. Pharm. Chem., 5, 63, (1962) describes certain 2-guanidinoquinazolines as antianxiety agents.

The compounds of the present invention have not been previously described and cannot be prepared by the methods disclosed in the above references. The process of the invention is novel and not suggested by the prior art processes. Antiviral activity in the compounds of the invention is an unexpected property, not predictable from the prior art references.

SUMMARY OF THE INVENTION

The invention comprises compounds selected from those of formula:

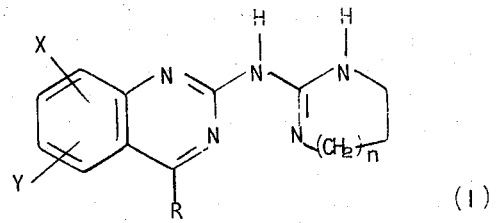

(I)

and the acid addition salts thereof wherein X and Y are each selected from hydrogen, halogen, lower alkyl and lower alkoxy; R is lower alkyl; and $n$ is an integer of from 0 to 1, inclusive. The invention also comprises methods of preparing the compounds (I) of the invention and the acid addition salts thereof, which are all active in vitro antiviral agents. The compounds of the invention are useful, for example, in biological laboratories as a component of animal tissue culture mediums when infection of such cultures with viruses is undesirable. The compounds of the invention are also useful components of anti-fungal and antibiotic compositions employed in air-conditioning and humidifying apparatus to prevent the growth of biological organisms on filters, sponges, and the like components and may be employed in concentrations of from about 5 percent to about 25 percent by weight of said compositions as an antiviral component thereof. The use of such compositions to maintain air-conditioning and humidifying equipment free of biological contaminants is well known. The compounds and compositions of the invention are particularly useful RNA-type antiviral agents against for example, Coxsackie A-21 (COE) and equine rhinovirus.

The term "halogen" is used herein in its normally accepted sense as embracive of chlorine, bromine, iodine, and fluorine.

The term "lower alkyl" as used throughout the specification and claims means alkyl having from 1 to 6 carbon atoms, inclusive. Illustrative of "lower alkyl" are alkyl groups such as methyl, ethyl, propyl, butyl, pentyl, hexyl, and isomeric forms thereof.

The term "lower alkoxy" means the monovalent group of formula:

—O—lower alkyl wherein lower alkyl is as defined above. Illustrative of "lower alkoxy" are groups such as methoxy, ethoxy, propoxy, butoxy, pentyloxy, hexyloxy, and the isomeric forms thereof.

Preferred compounds of the invention are those of formula (I) above wherein X and Y are each hydrogen and R is methyl.

DETAILED DESCRIPTION OF THE INVENTION

The process of the invention whereby the compounds (I) of the invention are obtained is carried out by heating within a temperature range of about 100°C. to about 200°C. a mixture of a quinazolinecarbamonitrile compound (II) and a diamine (III) in the presence of an inert organic solvent, a catalytic proportion of a strong acid and a thiol compound.

The reaction which occurs may be illustrated conveniently by the schematic formula:

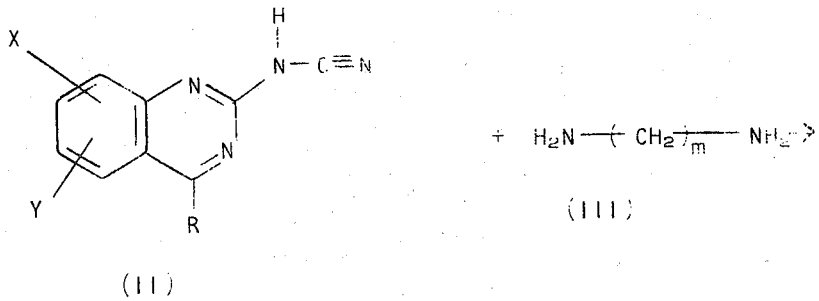

(II)          (III)

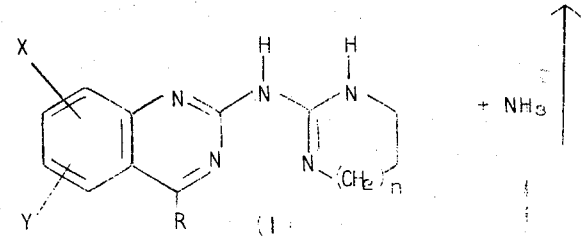

+ NH₃ wherein X, Y, R and n are as previously defined; m is an integer of from 2 to 3, inclusive.

The proportions of reactants (II) and (III) employed in the process of the invention are not critical. Generally, stoichiometric i.e., substantially equimolar proportions are used. In a preferred embodiment, an excess of the diamine reactant (III) is employed to speed the rate of reaction.

The term "inert organic solvent" as used herein means an organic solvent for the quinazolinecarbamonitrile (II) which is inert under the conditions of the reaction, i.e., does not enter into reaction with any of the reaction mixture components or interfere in any way with the desired course of the reaction. It is desirable that the organic solvent solublize completely the quinazolinecarbamonitrile (II) starting material, and sufficient proportions of inert organic solvent are employed to carry out this desire. Illustrative of inert organic solvents employed in the process of the invention are aliphatic, cycloaliphatic and aliphatic ether alcohols having a molecular weight of at least about 74 and a boiling point within the range of from about 100°C. to about 200°C. Illustrative of preferred inert organic solvents are n-butyl alcohol, sec-butyl alcohol, isoamyl alcohol, 2-methoxyethanol, 2-ethoxyethanol, cyclohexanol and like alcohols and ethers.

Strong acids employed in the process of the invention may be further characterized as those having a pK of less than about 1.0. Illustrative of strong inorganic acids are the strong mineral acids represented by hydrochloric, sulfuric and phosphoric acids. A strong organic acid such as p-toluenesulfonic acid is preferred.

The proportion of strong acid required is a catalytic proportion. In general a catalytic proportion is at least about 1 equivalent per mole of diamine reactant (III). Excess proportions of acid catalyst are generally not necessary, but will not adversely affect the desired reaction.

In a preferred embodiment, the acid catalyst is first reacted with the diamine reactant (III) so as to form the mono-acid of said diamine. In this form, both diamine reactant (III) and the acid catalyst are added in the preferred proportions to the reaction mixture. The reaction of diamines (III) with strong acids to form acid addition salts is a well known reaction.

Critical to the process of the invention whereby the novel compounds (I) of the invention are obtained, is the presence in the reaction mixture of at least about 0.01 equivalent of a thiol compound for each equivalent of the quinazolinecarbamonitrile reactant (II). Preferably, the proportion of thiol compound is within the range of from about 0.05 equivalent to about 0.2 equivalent per mole of reactant compound (II).

In general, any thiol compound having no reactive substituent groups, i.e., substituent groups reactive under conditions of the process herein described, may be used in the process of the invention. Advantageously, the thiol compund employed is a liquid having a boiling point above that temperature selected for carrying out the process. Preferably the thiol compound is a liquid at a temperature of from about 100°C. to about 200°C. and has a boiling point between about 125°C. and about 220°C.

Illustrative of preferred thiol compounds are aliphatic, cycloaliphatic, and aromatic thiols having from about 5 to about 8 carbon atoms, inclusive.

Illustrative of specific compounds employed in the process of the invention are aliphatic thiols such as n-butyl mercaptan, isoamyl mercaptan, n-amyl mercaptan, t-amyl mercaptan, n-hexyl mercaptan, n-heptyl mercaptan, n-octyl mercaptan, n-decyl mercaptan, n-octydecyl mercaptan and the like, and aromatic thiols such as benzenethiol, m-toluenethiol, p-toluenethiol, α-toluenethiol, α-naphthalenethiol, 1-phenylethanethiol, 3-phenyl-1-propanethiol, cyclohexanethiol and the like.

The course of the reaction comprising the process of the invention may be monitored by conventional analytical techniques to ascertain its progress. One physical indication that the reaction is complete is the cessation of ammonia gas by-product generation from the reaction mixture.

Upon completion of the reaction, the desired compounds (I) of the invention are readily separated from the reaction mixture by conventional methods. For example, solvent and thiol compounds are stripped from the reaction mixture by distillation and the desired compounds (I) solvent extracted from the distillation residue.

The compounds (I) of the invention form pharmaceutically acceptable acid addition salts which are useful for the same purposes as the free base. The pharmaceutically acceptable acid addition salts are prepared by neutralizing the free base with an appropriate acid to below about pH 7.0, preferably from about pH 3 to pH 6. Suitable acids for this purpose are illustrated by hydrochloric, sulfuric, phosphoric, acetic, palmitic, salicylic, cyclohexanesulfamic, and like acids.

Certain of the acid addition salts are hygroscopic and readily form hydrates upon exposure to water or water vapor. For example, the hydrochloric salt of the compounds (I) readily forms a hydrate in the presence of water. The hydrate form is readily dehydrated, when desired, by heating at about 120°C. to drive off the water. The hydrate and the dehydrate are both stable, and are useful for the same purposes. It is to be understood that reference to such acid addition salts in this specification and claims includes the hydrates thereof.

The acid addition salts of compound (I) are also useful to purify and upgrade the free base. Thus for example, in separating the compounds (I) from the reaction mixture obtained in the process of the invention, it is often convenient to acidify the solvent extracts, separate the acid salt derivative of the compounds (I) and basify the separated salt by known procedures to regenerate the free base of the compounds (I) of the invention.

Alkylene diamine reactants (III) employed in preparing the compounds (I) of the invention are well known compounds, the formula (III) representing specifically ethylenediamine and propylenediamine.

Quinazolinecarbamonitrile reactants (II) are for the most part generally well known. They are prepared by reacting the corresponding 2'-aminoalkyliophenone of formula:

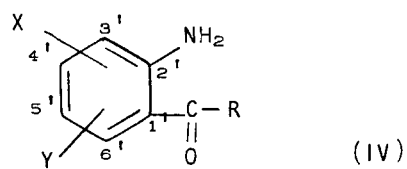

(IV)

wherein X, Y and R are as defined previously, with sodium dicyanamide, following the procedure of Theiling et al., supra. Compounds IV are generally well known, and are prepared by known methods, see for example the review of Simpson et al., J. Chem. Soc., 646, (1945). Those compounds (IV) wherein X and/or Y are lower alkyl and/or lower alkoxy groups, are prepared by reduction of the corresponding nitroalkyliophenone of formula:

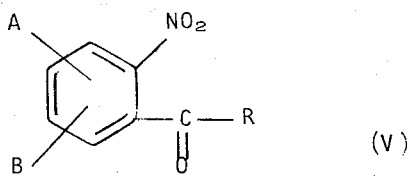

wherein A and B are each lower alkyl or lower alkoxy and R is as defined above. The reduction may be carried out by conventional and known methods, such as for example the method described by Simpson et al., J. Chem. Soc., 1702 (1948).

The 2'-nitroalkyliophenones (V) may be prepared by a variety of methods, for example by the reaction of the chloride of the corresponding 2-nitrobenzoic acid of formula:

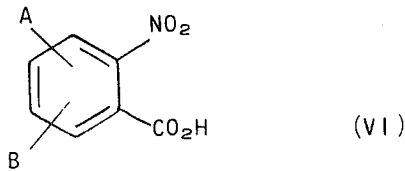

wherein A and B are as defined above, with ethyl ethoxymagnesiomalonate and decarboxylation of the resulting ester. Details of the method are those set forth for example in Simpson et. al., supra, and Blair et al., J. Chem. Soc., 2871 (1955).

The 2-nitrobenzoic acids (VI) are well known and may be prepared by nitration of the appropriate alkyl- or alkoxy- substituted benzoic acid [see Findeklee, Ber. 38, 3553 (1905) and Ewins, J. Chem. Soc., 101, 544] or by oxidation of the appropriate alkyl- or alkoxy- substituted nitrotoluene [method of Ullmann, Ber., 51, 9 (1918)].

Illustrative of the compounds (IV) are
2'-aminoacetophenone;
3'-chloro-;
4'-chloro-;
5'-chloro-;
6'-chloro-;
3'-bromo-;
5'-bromo-;
3',5'-dibromo-;
5'-fluoro-;
4',5'-dichloro-;
5'-iodo-;
3'-methyl-;
4'-methyl-;
4',5'-dimethyl-;
6'-methyl-;
3',4'-dimethyl-;
3'-methoxy-;
4'-methoxy-;
5'-methoxy-;
3',5'-dimethoxy-;
4',5'-dimethoxy-;
3'-chloro-4'-methyl-; and
5'-chloro-4'-methyl-2'-aminoacetophenone and the like;
2'-aminopropiophenone;
5'-chloro-;
6'-chloro-; and
4',5'-dimethoxy-2'-aminopropiophenone and the like;
2'-aminobutyrophenone, 2'-aminohexanophenone and the like.

The following examples describe the manner and process of making and using the invention and set forth the best mode contemplated by the inventors of carrying out the invention but are not to be construed as limiting.

EXAMPLE 1

An appropriate reaction vessel fitted with a means for stirring is charged with 50 gms. (0.27 moles) of 4-methyl-2-quinazolinecarbamonitrile (prepared by the method of Theiling, et. al., supra.), 80 gms. (0.345 moles) of ethylenediamine mono-p-toluenesulfonate, 5.0 gms. (0.040 moles) of α-toluenethiol and 500 ml. of 2-methoxyethanol. The air in the vessel is replaced with nitrogen gas. While continually stirring the reaction mixture, it is heated at reflux temperature (circa 120°C.) for 24 to 36 hours. At the end of this period, the reaction mixture is cooled to ambient temperature and solvent stripped under reduced atmospheric pressure. The residue is dissolved in a mixture of 1 liter of methylene chloride and 1 liter of 5 percent aqueous hydrochloric acid. To the resulting mixture there is added 3 liters of ether and the mixture is shaken. The aqueous phase is separated and the organic phase extracted twice with 1 liter portions of water. The aqueous extracts are combined and basified with sodium hydroxide solution in a pH circa. 8–10. A yellow gum precipitates which is crude 2-(2-imidazolin-2-ylamino)-4-methylquinazoline free base. The precipitate is separated by filtration, washed with water and partially air dried. The partially dried solid is then dissolved in 2 liter of a mixture of methylene chloride-methanol (95:5, v/v) to complete solution. An organic layer separates which is removed and dried over anhydrous potassium carbonate. Solvent is evaporated and the residue suspended in 400 ml. of methanol. Methanolic hydrogen chloride is added until the suspension has a pH of circa. 2–3 and the resulting mixture warmed until a solution is obtained having some undissolved impurities. The solution is filtered warm and diluted with about 1200 ml. of ether. Upon cooling, a solid precipitates which is separated by filtration. Upon recrystallization from methanol-ether (1:3, v/v) there is obtained 17.1 gms. of 2-(2-imidazolin-2-ylamino)-4-methylquinazoline hydrochloride hydrate in the form of a solid, M.P. 304°C. to 307°C. (dec.). By stripping solvent from the last filtrate obtained above and recrystallizing the residue from methanol-ether (1:3, v/v) an additional 1.4 gms. (total 18.5 gms.; 25 percent of theory) of product is obtained, M.P. 304°C. to 308°C. (dec.).

The identity of the product structure is confirmed by elemental analysis as follows:

Anal. Calcd. for $C_{12}H_{13}N_5HCl \cdot (H_2O)_{0.42}$ (percent): C, 53.14; H, 5.5; Cl, 13.1; N, 25.8; $H_2O$, 2.75. Found, (percent): C, 53.19; H, 5.69; Cl, 12.97; N, 25.77; H$_2$O, 2.75.

Similarly, following the above procedure but replacing the ethylenediamine mono-p-toluenesulfonate as used therein with an equal proportion of propylenediamine mono-p-toluenesulfonate there is obtained 2-[(1,4,5,6-tetrahydro-2-pyrimidinyl)-amino]-4-methylquinazoline hydrochloride hydrate.

Similarly, repeating the above procedure but replacing the 4-methyl-2-quinazolinecarbamonitrile as used therein with an equal molar proportion of 4-butyl-2-quinazolinecarbamonitrile, 4-hexyl-2-quinazolinecarbamonitrile, 6-chloro-4-methyl-2-quinazolinecarbamonitrile, 4,6-dimethyl-2-quinazolinecarbamonitrile and 6-methoxy-4-methyl-2-quinazolinecarbamonitrile, respectively, each of which is prepared by reacting the appropriate compound of formula (V) given previously herein, with sodium dicyanamide according to the method of Theiling, et al., supra., there is obtained 2-(2-imidazolin-2-ylamino)-4-butylquinazoline hydrochloride hydrate, 2-(2-imidazolin-2-ylamino)-4-hexylquinazoline hydrochloride hydrate, 6-chloro-2-(2-imidazolin-2-ylamino)-4-methylquinazoline hydrochloride hydrate, 4,6-dimethyl-2-(2-imidazolin-2-ylamino)-quinazoline hydrochloride hydrate and 6-methoxy-2-(2-imidazolin-2-ylamino)-4-methylquinazoline hydrochloride hydrate, respectively.

EXAMPLE 2

Upon heating any of the hydrochloride hydrates obtained according to Example 1 supra. at a temperature of circa 100°C. to 120°C. in an oven for about 24 hours, there is obtained the dehydrated forms thereof. The dehydrated forms upon being packaged under anhydrous conditions remain stable.

EXAMPLE 3

An appropriate vessel is charged with 2.7 gms. of 2-(2-imidazolin-2-yl)-4-methylquinazoline hydrochloride hydrate (Example 1, supra.) and 50 ml. of water. The resulting solution is basified with 10 percent sodium carbonate aqueous solution to a pH circa 8–10. A precipitate appears which is separated by filtration and washed with water. Upon drying the separated precipitate and recrystallization from n-butyl alcohol there is obtained 2.0 gms. of 2-(2-imidazolin-2-ylamino)-4-methylquinazoline free base in the form of a solid M.P. 288°C. to 289°C.

Anal. Calcd. for C$_{12}$H$_{13}$N$_5$, (percent): C, 63.42; H, 5.77; N, 30.82. Found (percent): C, 63.69; H, 5.51; N, 30.59.

Similarly, repeating the above procedure, but replacing the 2-(2-imidazolin-2-ylamino)-4-methylquinazoline hydrochloride hydrate as used therein with any of the hydrochloride hydrates prepared according to Example 1, supra., the corresponding free base is obtained.

The following example illustrates the use of the compounds (I) of the invention and the acid addition salts thereof.

EXAMPLE 4

In vitro Antiviral Activity

A series of virus susceptible host cell monolayer cultures are prepared, using as the virus growth medium a mixture of 4.5 parts by volume of Eagle's medium (containing 3 percent fetal bovine serum, glutamine and antibiotics) and 0.5 part by volume of Hank's solution containing varying proportions of 2-(2-imidazolin-2-ylamino)-4-methylquinazoline hydrochloride hydrate (Example 1., supra.). Control cultures are prepared similarly but without 2-(2-imidazolin-2-ylamino)-4-methylquinazoline hydrochloride hydrate in the Hank's solution.

The host cell monolayers are then inoculated with a variety of undiluted stock viruses (multiplicity of infection 0.1 or greater) and incubated for 60 minutes at 37°C. When from 50 to 100 percent of the control cells show cytopathology, virus titrations are carried out by the plaque method of assay [see Renis et al., J. Med. Chem., 10, 777, (1967)]. The titers found of each virus grown, the host cells employed and the concentrations of 2-(2-imidazolin-2-ylamino)-4-methylquinazoline hydrochloride hydrate used in the growth medium are shown in Table I, below. In the Table I, cultures group A is a control group.

TABLE 1

| GROUP | | A (Control) | B | C | D | E |
|---|---|---|---|---|---|---|
| Concentration of Treatment Compound | (mcg./ml.) | 0 | 3 | 12 | 50 | 200 |
| Host Cell | Virus | | | Virus Titers | | |
| M.L.* | Coxsackie A-21 | 1.3 × 10$^8$ | 1.0 × 10$^8$ | 5.2 × 10$^6$ | 1.9 × 10$^6$ | 8.5 × 10$^5$ |
| M.L.* | Equine-rhinovirus | 1.9 × 10$^7$ | 2.0 × 10$^7$ | 6.6 × 10$^4$ | 6.0 × 10$^3$ | 1.8 × 10$^3$ |

M.L.* - a stable cell culture obtained through the courtesy of Dr. D. A. Buthala. This culture has been maintained in the laboratory using essentially the method described by Buthala (J. Bacteriol. 86, 1356–1358, 1963).

We claim:
1. A compound selected from those of formula:

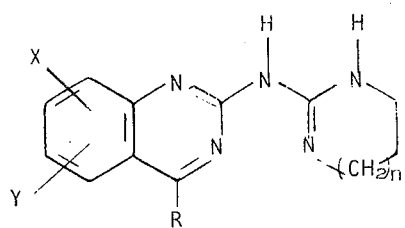

and the non-toxic pharmaceutically acceptable acid addition salts thereof wherein X and Y are each selected from hydrogen, halgoen, lower alkyl of one to six carbon atoms inclusive and lower alkoxy of one to six carbon atoms, inclusive; R is lower alkyl of one to six carbon atoms, inclusive, and *n* is 0 or 1.

2. A compound selected from those of formula:

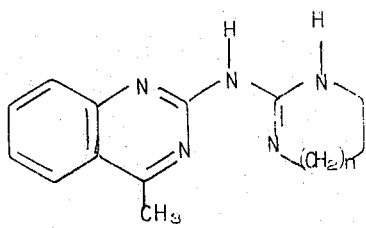

hydrochloride salt thereof and hydrochloride hydrate thereof, wherein *n* is 0 or 1.

3. A compound according to claim 2 which is 2-(2-imidazolin-2-ylamino)-4-methylquinazoline.

4. A compound according to claim 2 which is 2-(2-imidazolin-2-ylamino)-4-methylquinazoline hydrochloride.

5. A compound according to claim 2 which is 2-(2-imidazolin-2-ylamino)-4-methylquinazoline hydrochloride hydrate.

6. A process which comprises the step of heating within a temperature range of from about 100°C. to about 200°C. a mixture of i. a compound of the formula:

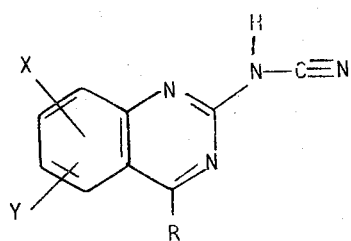

wherein X and Y are each selected from hydrogen, halogen, lower alkyl of one to six carbon atoms, inclusive and lower alkoxy, R is lower alkyl of one to six carbon atoms, inclusive,; and ii. a diamine of the formula:

$$H_2N-CH_2-NH_2$$

wherein *m* is an integer of from 2 to 3, inclusive; in the presence of an inert organic solvent, a catalytic proportion of a strong acid of pKa less than 1.0 and at least 0.01 equivalent of a thiol compound per equivalent of compound (i),.

7. A process according to claim 6 wherein said strong acid employed as a catalyst in p-toluenesulfonic acid.

8. A process according to claim 6 wherein said strong acid is added to said mixture in the form of the monoacid salt of said acid and the diamine (ii).

9. A process according to claim 8 wherein said salt is the salt of mono-p-toluenesulfonic acid and a diamine (ii).

10. A process according to claim 8 wherein said salt is ethylenediamine mono-p-toluenesulfonate.

11. A process according to claim 6 wherein said compound (i) is 4-methyl-2-quinazolinecarbamonitrile, said diamine (ii) is ethylenediamine and the product of the process is 2-(2-imidazolin-2-ylamino)-4-methylquinazoline.

12. A process according to claim 6 wherein said thiol compound is employed in a proportion of from about 0.05 equivalent to about 0.2 equivalent.

13. A process according to claim 6 wherein said thiol compound is α-toluenethiol.

* * * * *

UNITED STATES PATENT AND TRADEMARK OFFICE
CERTIFICATE OF CORRECTION

PATENT NO. : 3,900,476
DATED : August 19, 1975
INVENTOR(S) : Harold E. Renis and Louis L. Skaletzky It is certified that error appears in the above—identified patent and that said Letters Patent is hereby corrected as shown below:

Column 2, line 42; change "of about" to --of from about--.

Column 6, line 40; change "in a" to --to a--.

Column 6, line 45; change "liter" to --liters--.

Column 9, line 2; change "atonis" to --atoms--.

Column 10, line 3; change "alkoxy, R...." to --alkoxy of one to six carbon atoms, inclusive, R--.

Signed and Sealed this

Twenty-sixth Day of August 1980

[SEAL]

Attest:

SIDNEY A. DIAMOND

Attesting Officer     Commissioner of Patents and Trademarks